United States Patent
Wu et al.

(10) Patent No.: US 11,947,754 B2
(45) Date of Patent: Apr. 2, 2024

(54) CAPACITIVE TOUCH SCREEN DEVICE, READING METHOD THEREOF, AND DISPLAY DEVICE

(71) Applicant: Shenzhen China Star Optoelectronics Semiconductor Display Technology Co., Ltd., Shenzhen (CN)

(72) Inventors: Sijia Wu, Shenzhen (CN); Zhitao Lu, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/276,164

(22) PCT Filed: Dec. 31, 2020

(86) PCT No.: PCT/CN2020/142268
§ 371 (c)(1),
(2) Date: Mar. 15, 2021

(87) PCT Pub. No.: WO2022/141446
PCT Pub. Date: Jul. 7, 2022

(65) Prior Publication Data
US 2023/0325024 A1 Oct. 12, 2023

(30) Foreign Application Priority Data
Dec. 30, 2020 (CN) .......................... 202011601626.X

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05)

(58) Field of Classification Search
CPC ... G06F 3/0412; G06F 3/04164; G06F 3/0446
See application file for complete search history.

(56) References Cited

U.S. PATENT DOCUMENTS

| 8,330,728 | B2 * | 12/2012 | Li ......................... | G06F 3/0446 345/173 |
| 8,427,435 | B2 * | 4/2013 | Takahashi ............. | G06F 3/0446 345/173 |

(Continued)

FOREIGN PATENT DOCUMENTS

| CN | 101446876 A | 6/2009 |
| CN | 103728760 A | 4/2014 |

(Continued)

*Primary Examiner* — Joe H Cheng
(74) *Attorney, Agent, or Firm* — Nathan & Associates; Menachem Nathan

(57) ABSTRACT

The present disclosure provides a capacitive touch screen device, a reading method thereof, and a display device. A plurality of pixel units is divided into a plurality of touch detection regions. A touch sensing unit is configured for each touch detection region to detect charges in the touch detection region, thereby reducing a number of touch sensing units and independently collecting the charge detected by each touch sensor unit, further improving sensing accuracy. A plurality of read lines is added to correspond to each column of read units, simplifying in-plane lines.

19 Claims, 5 Drawing Sheets

(56) References Cited

U.S. PATENT DOCUMENTS

| | | | |
|---|---|---|---|
| 9,360,979 B2* | 6/2016 | Liu | G06F 3/0446 |
| 2014/0160086 A1* | 6/2014 | Lee | G06F 3/0418 |
| | | | 345/178 |
| 2015/0185930 A1 | 7/2015 | Xu | |
| 2016/0117013 A1* | 4/2016 | Xiao | G06F 3/0421 |
| | | | 345/174 |
| 2016/0154515 A1* | 6/2016 | Mu | G06F 3/0446 |
| | | | 345/174 |
| 2017/0277332 A1 | 9/2017 | Seder et al. | |
| 2019/0004650 A1 | 1/2019 | Ma | |
| 2019/0079606 A1 | 3/2019 | Kim et al. | |
| 2020/0285367 A1* | 9/2020 | Huang | G06F 3/0412 |

FOREIGN PATENT DOCUMENTS

| | | | |
|---|---|---|---|
| CN | 103870077 A | | 6/2014 |
| CN | 104090697 A | | 10/2014 |
| CN | 109491531 A | | 3/2019 |
| KR | 20130136374 A | * | 12/2013 |

* cited by examiner

CAPACITIVE TOUCH SCREEN DEVICE, READING METHOD THEREOF, AND DISPLAY DEVICE

This application is the National Stage under 35 U.S.C. § 371 of PCT/CN2020/142268 filed on Dec. 31, 2020, which claims priority under 35 U.S.C. § 119 of Chinese Application No. CN202011601626.X filed on Dec. 30, 2020, the disclosure of which is incorporated by reference.

FIELD OF INVENTION

The present disclosure relates to the field of display technologies and particularly to a capacitive touch screen device, a reading method thereof, and a display device.

BACKGROUND OF INVENTION

Because a touch sensing function of display panels can bring more variety and convenience to the user experience, touch screens are used more in various industries. Capacitive touch screens, in particular, occupy a large share of the touch screen market.

Currently, capacitive touch screens adopt two reading methods for reading touch signals. A first reading method is to read horizontal and vertical touch signals directly on pixel units to determine a horizontal coordinate and a vertical coordinate of a touch point. But when this reading method is used for multi-touch on the touch screen, it is easy to touch ghost points without touch events. For example, FIG. 1 is a schematic structural view of a first capacitive touch screen in the prior art. As shown in FIG. 1, when two black points with coordinates (X2, Y2) and (X3, Y3) are touched, two shadow points of coordinates (X3, Y2) and (X2, Y3) are prone to being touched. These two shadow points are ghost points. FIG. 2 is a structural diagram of a second capacitive touch screen in the prior art. As shown in FIG. 2, a second reading method of the second capacitive touch screen is: separately drawing out a read line from each pixel unit. Although this reading method can determine a horizontal coordinate and a vertical coordinate of each touch point, have a high sensing accuracy, and have no ghost points, this reading method has too many read lines, and integration methods and signal reading are very difficult for display panels with high resolution and large sizes.

Capacitive touch screens in prior art have technical problems, including susceptibility to ghost points when multi-touch is performed and too many read lines leading to difficulties with integration and signal reading.

SUMMARY

In order to solve the technical problem of ghost points easily appearing when the capacitive touch screen performs multi-touch, or integration and signal reading difficult leaded to by too many read lines, embodiments of the present disclosure provide a capacitive touch screen device and a reading method thereof, and a display device.

In a first aspect, an embodiment of the present disclosure provides a capacitive touch screen device, including:
  a plurality of gate lines, a plurality of data lines, and a plurality of common electrode lines, wherein the plurality of gate lines and the plurality of data lines perpendicularly intersect to form a plurality of pixel units arranged in an array; each of the plurality of common electrode lines is arranged in parallel with each of the plurality of gate lines and is arranged between one row of the plurality of pixel units and one of the plurality of common electrode lines, wherein the plurality of pixel units are divided into a plurality of touch detection regions, and an area of each of the plurality of touch detection regions is smaller than an area of a capacitive touch screen of the capacitive touch screen device touched by a finger;
  a plurality of touch sensing units, wherein each of the plurality of touch sensing units is connected to one of the plurality of gate lines and one of the plurality of common electrode lines connected to any row of the plurality of pixel units in a corresponding touch detection region, and each of the touch sensing units is configured to detect charges in the corresponding touch detection region; and
  a plurality of read lines, wherein the plurality of read lines are arranged in parallel with the plurality of data lines, and each of the plurality of read lines is configured to connect to the plurality of touch sensing units located in a same column to convert the charges in each of the plurality of touch detection regions into a current and to output the current.

In some embodiments, the capacitive touch screen device further includes a plurality of read units connected to the plurality of read lines; wherein the plurality of read units are configured to convert a current output by the plurality of read lines into an output voltage and read it, and a touch position in the plurality of touch detection regions is determined according to changes in the output voltage.

In some embodiments, each of the plurality of pixel units includes a display transistor, a liquid crystal capacitor, and a storage capacitor, wherein
  a gate electrode of the display transistor is connected to a corresponding gate line, a source electrode of the display transistor is connected to a corresponding data line, and a drain electrode of the display transistor is connected to one end of the liquid crystal capacitor and one end of the storage capacitor; and
  another end of the liquid crystal capacitor is connected to a common electrode of a color filter substrate, another end of the storage capacitor is connected to a common electrode of an array substrate, and the common electrode of the array substrate is connected to the plurality of common electrode lines.

In some embodiments, the touch sensing unit includes a first transistor, a second transistor, a reference capacitor, and a sensing capacitor, wherein
  a gate electrode and a source electrode of the first transistor are connected to each other and connected to the common electrode of the array substrate connected to any row of the plurality of pixel units, and a drain electrode of the first transistor is connected to a sensing node;
  one end of the reference capacitor is connected to the sensing node, and another end of the reference capacitor is grounded;
  one end of the sensing capacitor is connected to the sensing node, and another end of the sensing capacitor is grounded; and
  a gate electrode of the second transistor is connected to the plurality of gate lines connected to any row of the plurality of pixel units, a source electrode of the second transistor is connected to the sensing node, and a drain electrode of the second transistor is connected to a corresponding read line.

In some embodiments, each of the plurality of read units comprising an integrator, an amplifier, and an analog-to-digital converter connected in sequence, wherein the integrator is configured to integrate the current output by the plurality of read lines to obtain the output voltage;

the amplifier is configured to amplify the output voltage; and the analog-to-digital converter is configured to convert the output voltage amplified by the amplifier from an analog signal to a digital signal and read it.

In some embodiments, each of the touch sensing units is located in a corresponding touch detection region or between two adjacent touch detection regions two adjacent.

In some embodiments, each of the plurality of touch detection regions comprises a same number of rows of the plurality of pixel units and a same number of columns of the plurality of pixel units.

In a second aspect, an embodiment of the present disclosure provides a reading method for the capacitive touch screen device described above, including:

S1, detecting the charge in the corresponding touch detection region in real time through each of the plurality of touch sensing units;

S2, converting the charge into the current, outputting the current through the plurality of read lines, and converting the current into the output voltage through the plurality of read units, and reading it; and S3, determining the touch position by determining the touch detection region according to at least one of the plurality of read lines, when the output voltage converted from the current output by at least one of the plurality of read lines exceeds a preset threshold.

In some embodiments, when the capacitive touch screen is not touched, the charge in the corresponding touch detection region detected by the plurality of touch sensing units is:

$$Q1=Ci*Vcom$$

Wherein Q1 is the charge when the plurality of touch detection regions are not touched, Ci is a capacitance value of a reference capacitor, and Vcom is a potential of a common electrode of an array substrate, that is, a potential of one of the plurality of common electrode lines; and the output voltage read through the plurality of read units is:

$$Vout1=Ci*Vcom/Cf$$

Wherein Vout1 is the output voltage of the plurality of read units when the plurality of touch detection regions are not touched, and Cf is a feedback capacitance of an integrator.

In some embodiments, when the capacitive touch screen is touched, the charge in a corresponding touch detection region detected through the plurality of touch sensing units is:

$$Q2=(Ci+Cp)*Vcom$$

Wherein Q2 is the charge when the plurality of touch detection regions are touched, Ci is a capacitance value of a reference capacitor, Cp is a capacitance value of a sensing capacitor, Vcom is a potential of a common electrode of an array substrate, that is, a potential of one of the plurality of common electrode lines; and the output voltage read through the plurality of read units is:

$$Vout2=(Ci+Cp)*Vcom/Cf$$

Wherein Vout2 is the output voltage of the plurality of read units when the plurality of touch detection regions are touched, and Cf is a feedback capacitance of an integrator.

In a third aspect, an embodiment of the present disclosure provides a display device. The display device includes a capacitive touch screen device. The capacitive touch screen device includes:

a plurality of gate lines, a plurality of data lines, and a plurality of common electrode lines, wherein the plurality of gate lines and the plurality of data lines perpendicularly intersect to form a plurality of pixel units arranged in an array; one of the plurality of common electrode lines is arranged in parallel with one of the plurality of gate lines and is arranged between the plurality of pixel units and one of the plurality of common electrode lines, wherein the plurality of pixel units is divided into a plurality of touch detection regions, and an area of each of the plurality of touch detection regions is smaller than an area of a capacitive touch screen of the capacitive touch screen device touched by a finger;

a plurality of touch sensing units, wherein each of the plurality of touch sensing units is connected to one of the plurality of gate lines and one of the plurality of common electrode lines connected to any row of the plurality of pixel units in a corresponding touch detection region; and each of the plurality of touch sensing units is configured to detect a charge in the corresponding touch detection region;

a plurality of read lines arranged in parallel with the plurality of data lines, and each of the plurality of read lines is configured to connect the plurality of touch sensing units located in a same column to convert the charge in each of the plurality of touch detection regions into a current and to output the current; and a plurality of read units connected to the plurality of read lines; wherein the plurality of read units are configured to convert the current output by the plurality of read lines into an output voltage and read it, and a touch position in the plurality of touch detection regions is determined according to changes in the output voltage.

In some embodiments, each plurality of pixel units includes a display transistor, a liquid crystal capacitor, and a storage capacitor; and wherein a gate electrode of the display transistor is connected to a corresponding gate line, a source electrode of the display transistor is connected to a corresponding data line, and a drain electrode of the display transistor is connected to one end of the liquid crystal capacitor and one end of the storage capacitor; and another end of the liquid crystal capacitor is connected to a common electrode of a color filter substrate, another end of the storage capacitor is connected to a common electrode of an array substrate, and the common electrode of the array substrate is connected to the plurality of common electrode lines.

In some embodiments, the touch sensing unit includes a first transistor, a second transistor, a reference capacitor, and a sensing capacitor, wherein a gate electrode and a source electrode of the first transistor are connected to each other and connected to the common electrode of the array substrate connected to any row of the plurality of pixel units, and a drain electrode of the first transistor is connected to a sensing node;

one end of the reference capacitor is connected to the sensing node, and another end of the reference capacitor is grounded;

one end of the sensing capacitor is connected to the sensing node, and another end of the sensing capacitor is grounded; and a gate electrode of the second transistor is connected to the plurality of gate lines connected to any row of the plurality of pixel units, a source electrode of the second transistor is connected to the sensing node, and a drain electrode of the second transistor is connected to a corresponding read line.

In some embodiments, each of the plurality of read units includes an integrator, an amplifier, and an analog-to-digital converter connected in sequence, wherein the integrator is configured to integrate the current output by the plurality of read lines to obtain the output voltage;

the amplifier is configured to amplify the output voltage; and the analog-to-digital converter is configured to convert the output voltage amplified by the amplifier from an analog signal to a digital signal, and read it.

In some embodiments, each of the plurality of touch sensing units is located in a corresponding touch detection region, or located between two adjacent touch detection regions.

In some embodiments, an area of each of the plurality of touch detection regions is same.

In some embodiments, each of the plurality of touch detection regions includes a same number of rows and a same number of columns of pixel units.

In some embodiments, when the capacitive touch screen is not touched, the charge in the corresponding touch detection region detected through the plurality of touch sensing units is:

$$Q1=Ci*Vcom$$

wherein Q1 is the charge when the plurality of touch detection regions are not touched, Ci is a capacitance value of a reference capacitor, and Vcom is a potential of a common electrode of an array substrate, that is, a potential of one of the plurality of common electrode lines; and the output voltage read through the plurality of read unit is:

$$Vout1=Ci*Vcom/Cf$$

wherein Vout1 is the output voltage of the plurality of read units when the plurality of touch detection regions is not touched, and Cf is a feedback capacitance of an integrator.

In some embodiments, when the capacitive touch screen is touched, the charge in a corresponding touch detection region detected through the plurality of touch sensing units is:

$$Q2=(Ci+Cp)*Vcom$$

Wherein Q2 is the charge when the plurality of touch detection regions are touched, Ci is a capacitance value of a reference capacitor, Cp is a capacitance value of a sensing capacitor, Vcom is a potential of a common electrode of an array substrate, that is, a potential of one of the plurality of common electrode lines; and the output voltage read through the plurality of read unit is:

$$Vout2=(Ci+Cp)*Vcom/Cf$$

wherein Vout2 is the output voltage of the plurality of read units when the plurality of touch detection regions is touched, and Cf is a feedback capacitance of an integrator.

The embodiments of the disclosure provide a capacitive touch screen device, a reading method thereof, and a display device. The capacitive touch screen device, the reading method thereof, and the display device divide pixel units into a plurality of touch detection regions, and only one touch sensing unit needs to be configured for each touch detection region, instead of configuring a separate touch sensing unit for each pixel unit, the touch sensing unit corresponding to the touch detection region is connected to one of the plurality of gate lines Gate and one of the plurality of common electrode lines connected to any row of the plurality of pixel units, so as to detect the change of the charge in a corresponding one of the touch detection region, thereby greatly reducing a number of the touch sensing units. Moreover, in addition to adding a smaller number of touch sensing units, only the read lines corresponding to each column of read units are added, each of the read lines is configured to connect to the touch sensor units in a same column, so that a very concise in-plane wiring is obtained; and furthermore, the charges detected by each touch sensing unit can be collected separately, so a sensing accuracy of the capacitive touch screen device is high, and ghost points can be effectively prevented when multi-touch is implemented.

DETAILED DESCRIPTION OF EMBODIMENTS

In order to make purposes, technical solutions, and effects of this disclosure clearer and more specific, hereinafter this disclosure will further describe in detail with reference to the drawings and embodiments. It should be understood that specific embodiments described here are only used to explain this disclosure, and not to limit this disclosure.

All the embodiments of the present disclosure distinguish two electrodes of the thin film transistor besides a gate electrode, and one of them is called a source electrode and the other one is called a drain electrode. Since the source electrode and the drain electrode of the thin film transistor are symmetrical, the source electrode and the drain electrode are interchangeable. According to a form of the thin film transistor in the figures, it is stipulated that a middle portion of the thin film transistor is the gate electrode, a signal input end is the source electrode, and a signal output end is the drain electrode. In addition, the thin film transistors in all the embodiments of the present disclosure may include P-type and/or N-type transistors, wherein the P-type thin film transistor is turned on when the gate electrode is at a low potential and is turned off when the gate electrode is at a high potential; the N-type thin film transistor is turned on when the gate electrode is at a high potential and is turned off when the gate electrode is at a low potential.

Figure 1:
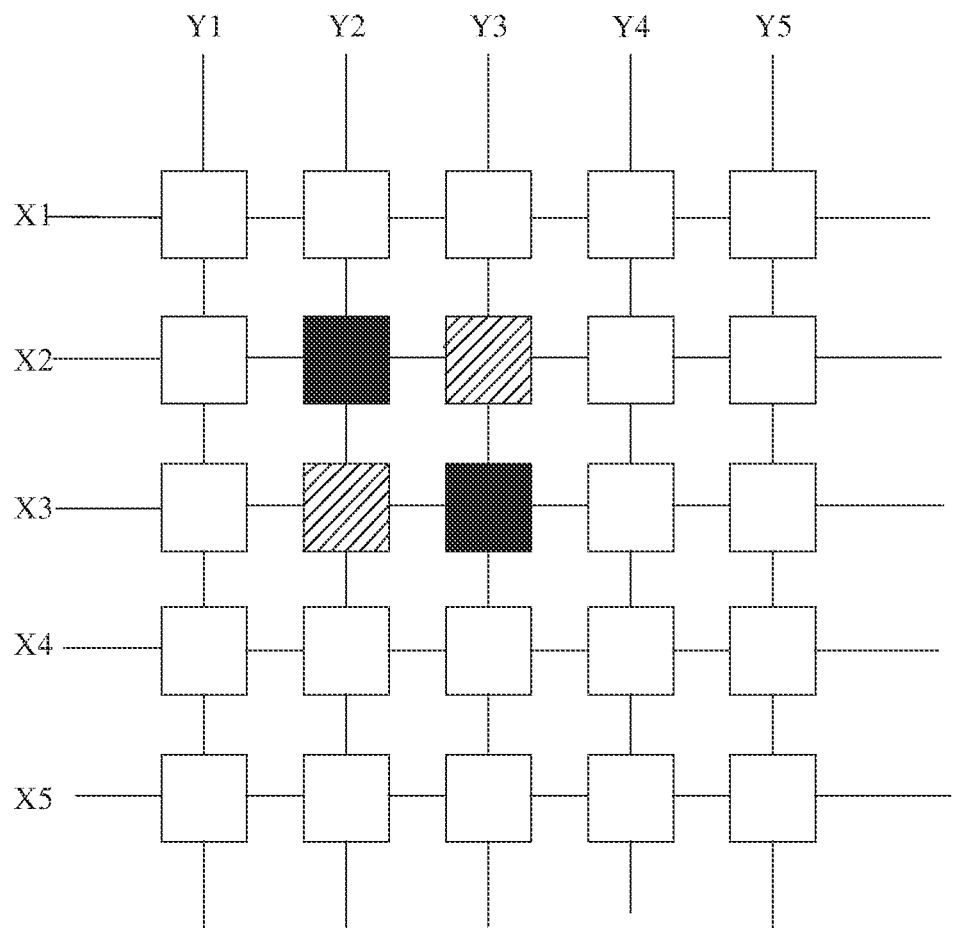
FIG. 1 is a structural schematic view of a first capacitive touch screen device in prior art.
Figure 2:
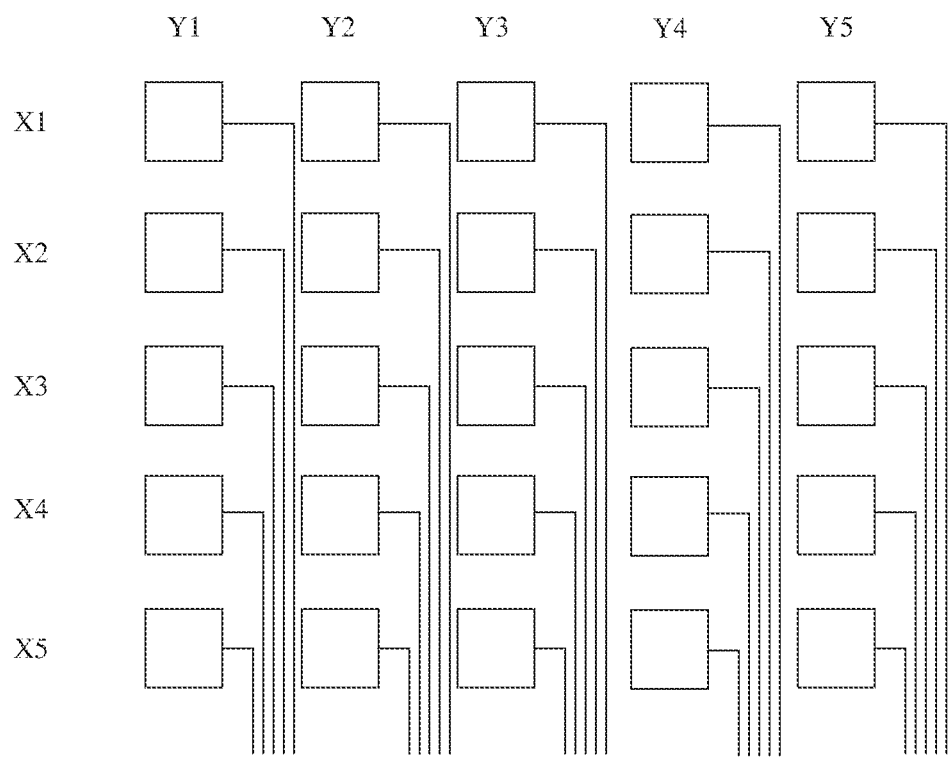
FIG. 2 is a structural schematic view of a second capacitive touch screen device in prior art.
Figure 3:
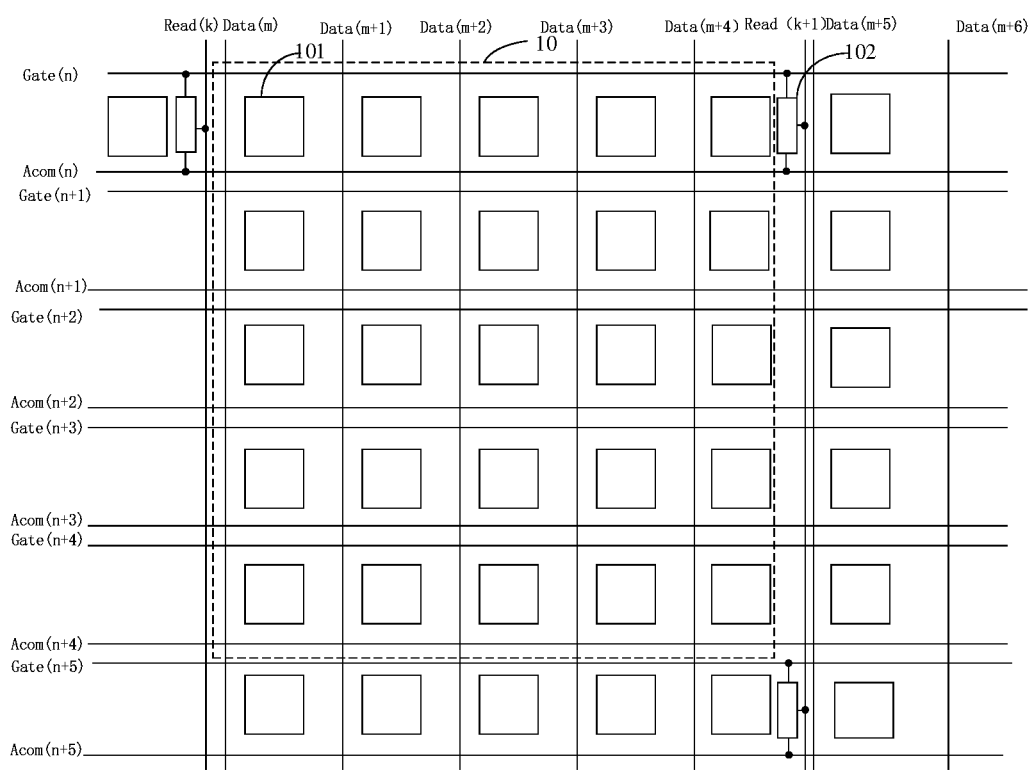
FIG. 3 is a structural schematic view of a capacitive touch screen device according to an embodiment of the present disclosure.

FIG. 3 is a structural schematic view of a capacitive touch screen device according to an embodiment of the present disclosure. As shown in FIG. 3, the capacitive touch screen device includes a capacitive touch screen, a gate driver (not shown in the figure), and a source driver (not shown in the figure). The capacitive touch screen of the capacitive touch screen device is a display panel that integrates touch and display. In embodiments of the present disclosure, a plurality of pixel units 101 are divided into a plurality of touch detection regions (a dashed frame shown in FIG. 3 is a touch detection region 10) The capacitive touch screen includes a plurality of gate lines Gate (n), Gate (n+1), Gate (n+2), Gate (n+3), Gate (n+4), etc., a plurality of common electrode lines Acom (n), Acom (n+1), Acom (n+2), Acom (n+3), Acom (n+4), etc., and a plurality of date lines Date (m), Date (m+1), Date (m+2), Date (m+3), Date (m+4), etc. The plurality of gate lines Gate (n), Gate (n+1), Gate (n+2), Gate (n+3), Gate (n+4), etc. and the plurality of common electrode lines Acom (n), Acom (n+1), Acom (n+2), Acom (n+3), Acom (n+4), etc. extend along a first direction, and the plurality of date lines Date (m), Date (m+1), Date (m+2), Date (m+3), Date (m+4), etc. extend along a second direction. The first direction is perpendicular to the second direction, wherein the plurality of gate lines and the plurality of data lines perpendicularly intersect to form a plurality of pixel units arranged in an array. One of the plurality of common electrode lines is arranged between one row of the plurality of pixel units and one of the plurality of common electrode lines. If the first direction is a row and the second direction is a column, each row of the plurality of pixel units includes red pixel units R, green pixel units G, and blue pixel units B (not shown in the figure). The red pixel units R, the green pixel units G, and the blue pixel units B are periodically arranged. The gate driver is configured to drive each row of the plurality of pixel units to turn on through the plurality of gate lines. The source driver is configured to apply a data voltage onto each row of the plurality of pixel units through the plurality of data lines when each row of the plurality of pixel units is turned on. The plurality of common electrode lines is configured to apply a common voltage to form a voltage difference between a pixel electrode and a common electrode, so that liquid crystal molecules sandwiched between the common electrode and the pixel electrode are twisted to produce light transmission to make backlights pass through.

Specifically, the capacitive touch screen device is provided with a touch sensing unit 102 for each touch detection region 10, and each touch sensing unit 102 is connected to one of the plurality of gate lines and one of the plurality of common electrode lines connected to any row of the plurality of pixel units in a corresponding touch detection region 10. A change in a charge in one of the plurality of touch detection regions 10 is detected through detecting a change of a charge of any row of pixel units in a corresponding touch detection region 10. The plurality of touch sensing units located in a same column are connected to each other by the plurality of read lines Read (k), Read (k+1), etc. extending along the second direction, i.e., the plurality of read lines Read (k), Read (k+1), etc. arranged in parallel with the plurality of data lines, and the charge detected by the plurality of touch sensing units is converted into a current and output by the plurality of read lines Read (k), Read (k+1), etc. extending along the second direction, i.e., the plurality of read lines Read (k), Read (k+1), etc. arranged in parallel with the plurality of data lines. The greater the charge, the larger the current output by the plurality of read lines Read.

It should be noted that the dashed frame in FIG. 3 is only an example of one of the plurality of touch detection regions 10 including 5 rows*5 columns pixel units 101, and the touch sensing unit 102 is located outside the touch detection region 10 and is connected to one of the plurality of gate lines Gate and one of the plurality of common electrode lines connected to a first row of the 5 rows*5 columns of pixel units 101 included by the touch detection region 10. In fact, a shape of each touch detection region 10 and a number of the pixel units included in the touch detection region 10 can be set by oneself, and the touch sensing unit 102 corresponding to the touch detection region 10 can also be inside the touch detection region 10, as long as it is connected to one of the plurality of gate lines Gate and one of the plurality of common electrode lines connected to any row of the plurality of pixel units 101, so as to measure changes in the charge in the touch detection region 10.

It should also be noted that this embodiment of the present disclosure only needs to detect the charge of any row of pixels in the touch detection region 10 because an area of the capacitive touch screen touched by a finger is generally larger, and an area of the pixel unit is generally smaller, i.e., the area of the capacitive touch screen touched by a finger is much larger than the area of the pixel unit. Therefore, an area not larger than the area of the capacitive touch screen touched by a finger can be used as an area of the touch detection region 10, i.e., the area of each touch detection region 10 is smaller than the area of the capacitive touch screen touched by a finger.

In an embodiment of the present disclosure, each touch sensing unit 102 is connected to one of the plurality of gate lines Gate and one of the plurality of common electrode lines connected to any row of the plurality of pixel units to connect each touch sensing unit 102 to each touch detection region 10. A horizontal coordinate of the touch detection region 10, i.e., the horizontal coordinate of the touch position (when the row of pixel units is turned on, i.e., when the gate line Gate corresponding to the row of pixel units is at a high level) is determined by one of the plurality of gate lines Gate or one of the plurality of common electrode lines of any row of the plurality of pixel units in each touch detection regions 10, and there is no need to arrange additional lines for obtaining horizontal coordinates. In addition, the charge in the touch detection region 10 is converted into a current and output through the read line Read, i.e., a vertical coordinate of the touch detection region 10, that is, the vertical coordinate of the touch position can be determined by the change of the current output by the read line Read, and finally the touch position can be determined according to the horizontal and vertical coordinates of the touch position.

Compared with a traditional capacitive touch screen, the capacitive touch screen device provided by the embodiment of the present disclosure divides the pixel units into a plurality of touch detection regions 10, and only one touch sensing unit 102 needs to be configured for each touch detection region 10, instead of configuring a separate touch sensing unit 102 for each pixel unit. As such, a number of the touch sensing units 102 is greatly reduced. Moreover, in addition to adding a smaller number of touch sensing units 102, only the read lines Read corresponding to each column of read units 103 are added, so that a very concise in-plane wiring is obtained; furthermore, the charges detected by each touch sensing unit can be collected separately, so a sensing accuracy of the capacitive touch screen device is high, and ghost points can be effectively prevented when multi-touch is implemented. It can be understood that, in order to further reduce the number of read lines Read, the plurality of touch sensing units 102 can be arranged in a same column as much as possible.

It is understandable that the area of each touch detection region 10 can be divided according to actual conditions. For example, the area of the touch detection region 10 with high touch frequency is set to be relatively large to improve sensing accuracy, and the area of the touch detection region 10 with low touch frequency is set to be relatively small, so as to appropriately reduce the number of the touch detection region 10, the touch sensing unit 102, and the read lines Read, thereby saving cost. However, generally, in order to keep the sensing accuracy of each touch detection region 10 same, each touch detection region 10 can be set to include a same number of pixel units arranged in an array, specifically, it can include pixel units with a same number of rows and a same number of columns. Furthermore, each touch sensing unit 102 is arranged at a fixed position inside or outside the touch detection region 10. It should be emphasized that each touch sensing unit 102 is located in the corresponding touch detection region 10 or between two adjacent touch detection regions 10 in order to use each touch sensing unit 102 to detect changes in the charge in each touch detection region 10.

Figure 4:
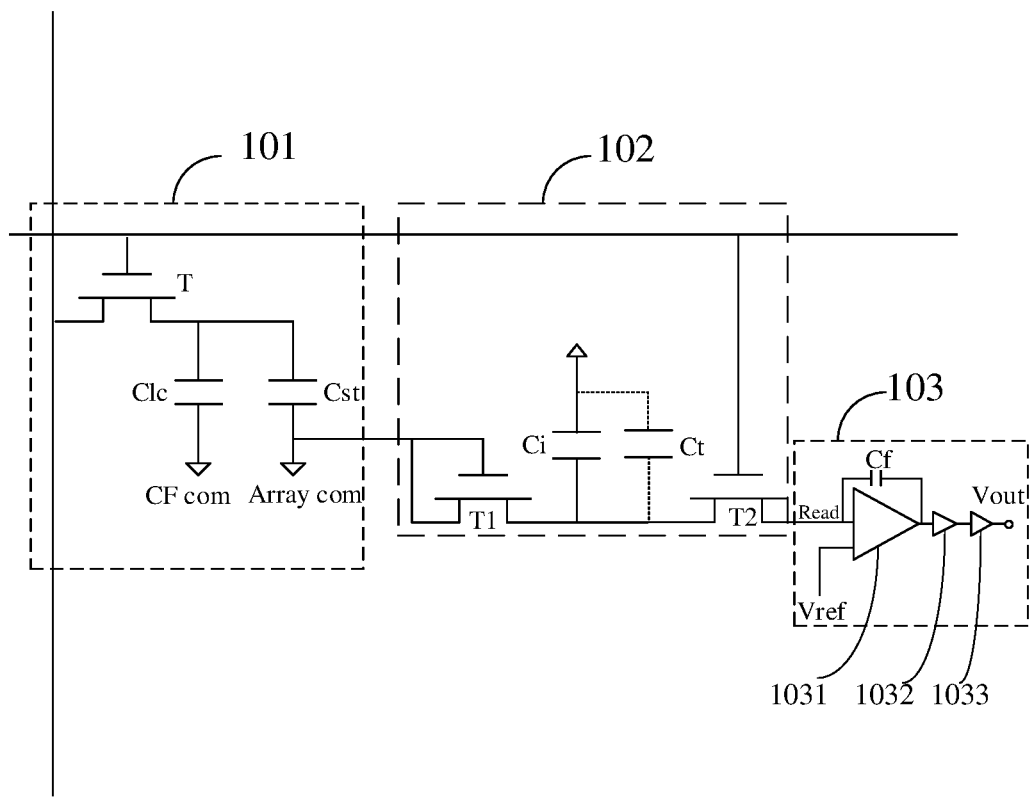
FIG. 4 is an equivalent circuit diagram of a pixel unit, a touch sensing unit, and a read unit provided by an embodiment of the present disclosure.

Further, as shown in FIG. 4, the capacitive touch screen device further includes: a plurality of read units 103 connected to a plurality of read lines Read, the plurality of read units 103 are configured to convert the current output by the plurality of read lines Read into an output voltage and read it, the change of the output voltage Vout can be known conveniently and intuitively, the touch detection region 10 with a large change in charge can be determined according to the output voltage Vout, so as to determine the touch position according to the touch detection region 10.

FIG. 4 is an equivalent circuit diagram of a pixel unit, a touch sensing unit 102, and a read unit 103 provided by an embodiment of the present disclosure. As shown in FIG. 4, each of the plurality of pixel units includes a display transistor T, a liquid crystal capacitor Clc, and a storage capacitor Cst, wherein A gate electrode of the display transistor T is connected to a corresponding gate line, a source electrode of the display transistor T is connected to a corresponding data line, and a drain electrode of the display transistor T is connected to one end of the liquid crystal capacitor Clc and one end of the storage capacitor Cst.

Another end of the liquid crystal capacitor Clc is connected to a common electrode CF com of a color filter substrate, another end of the storage capacitor Cst is connected to a common electrode Array com of an array substrate, and the common electrode of the array substrate is connected to the plurality of common electrode lines Acom.

It should be noted that the embodiments of the present disclosure are directed at a circuit structure on the array substrate, and the plurality of common electrode lines Acom in the embodiments of the present disclosure are common electrode lines on the array substrate.

As shown in FIG. 4, the touch sensing unit 102 includes a first transistor T1, a second transistor T2, a reference capacitor Ci, and a sensing capacitor Ct, and wherein a gate electrode and a source electrode of the first transistor T1 are connected to each other and connected to the common electrode of the array substrate connected to any row of the plurality of pixel units, and a drain electrode of the first transistor T1 is connected to a sensing node.

One end of the reference capacitor Ci is connected to the sensing node, and another end of the reference capacitor Ci is grounded.

One end of the sensing capacitor Ct is connected to the sensing node, and another end of the sensing capacitor Ct is grounded.

A gate electrode of the second transistor T2 is connected to the plurality of gate lines connected to any row of the plurality of pixel units, a source electrode of the second transistor T2 is connected to the sensing node, and a drain electrode of the second transistor T2 is connected to a corresponding-read line Read.

It should be noted that the reference capacitance Ci refers to an inherent capacitance of the touch detection region 10 when the touch detection region 10 is not touched. A capacitance value of the reference capacitance Ci is small. And when the touch detection region 10 is touched, it is the equivalent of connecting a larger sensing capacitance Ct in parallel with the reference capacitance Ci at the sensing node, i.e., at this time, a capacitance Cp of the touch sensing unit 102 corresponding to the touch detection region 10 increases to Ci+Ct. In other words, when the touch detection region 10 is not touched, the capacitance Cp of the touch detection region 10 is only the reference capacitance Ci. At this time, the sensing capacitance Ct does not exist, and it can be understood that the sensing capacitance Ct is 0, i.e., Cp=Ci; and when the touch detection region 10 is touched, the sensing capacitance Ct in parallel with the reference capacitance Ci is generated in the touch detection region 10, and the capacitance Cp of the touch detection region 10 is the capacitance value generated by the reference capacitance Ci and the sensing capacitance Ct in parallel, i.e., Cp=Ci+Ct.

Specifically, according to a calculation formula of the charge at both ends of a capacitor: $Q=C*V$, wherein Q is the charge at both ends of the capacitor, C is a capacitance value of the capacitor, and V is a voltage across the capacitor, it can be seen that when the row of the plurality of pixel units connected to the touch sensing unit 102 is not turned on, i.e., when the gate line Gate connected to the touch sensing unit 102 is at a low level, the display transistors T of the plurality of pixel units and the second transistors T2 of the plurality of touch sensing units 102 are both turned off, and the first transistor T1 uses the common electrode of the array substrate to make the reference capacitor Ci continuously charged through the common electrode line until the charge Q1 reaches $Ci*Vcom$, wherein Q1 is the charge when the plurality of touch detection regions 10 are not touched, and Ci is the capacitance value of the reference capacitor, Vcom is a potential of the common electrode of the array substrate, i.e., a potential of the plurality of common electrode lines.

When the touch detection region 10 corresponding to the touch sensing unit 102 is touched, and a row of the plurality of pixel units connected to the touch sensing unit 102 is turned on, i.e., when the gate line Gate connected to the touch sensing unit 102 is at a high level, the touch sensing unit 102 generates a sensing capacitor Ct in parallel with the reference capacitor Ci. At this time, the first transistor T1 uses the common electrode Array com of the array substrate to make the reference capacitor Ci and the sensing capacitor Ct continuously charged through the common electrode line Acom until the charge Q2 reaches $(Ci+Ct)*Vcom$, wherein Q2 is the charge when the touch detection region 10 is touched, and Ci is the capacitance value of the reference capacitor, Cp is the capacitance value of the reference capacitor, Vcom is the potential of the common electrode of the array substrate, i.e., the common electrode line.

And then, the charge Q1 (when the touch detection region 10 is not touched) or the charge Q2 (when the touch detection region 10 is touched) is converted into a current by the plurality of read lines Read.

As shown in FIG. 4, each of the plurality of read units 103 includes an integrator 1031, an amplifier 1032, and an analog-to-digital converter 1033 connected in sequence, wherein:

The integrator 1031 is configured to integrate the current output by the plurality of read lines Read to obtain the output voltage.

The amplifier 1032 is configured to amplify the output voltage.

The analog-to-digital converter 1033 is configured to convert the amplified output voltage from an analog signal to a digital signal and read it.

Specifically, when the capacitive touch screen is not touched, the output voltage of the plurality of read units 103 is:

$$Vout1=Q1/Cf=Ci*Vcom/Cf$$

Vout1 is the output voltage of the plurality of read units when the plurality of touch detection regions are not touched, and Cf is a feedback capacitance of an integrator.

When the capacitive touch screen is touched, the output voltage of the plurality of read units 103 is:

$$Vout2=Q2/Cf=(Ci+Cp)*Vcom/Cf$$

Vout2 is the output voltage of the plurality of read units when the plurality of touch detection regions are touched, and Cf is a feedback capacitance of an integrator.

Figure 5:
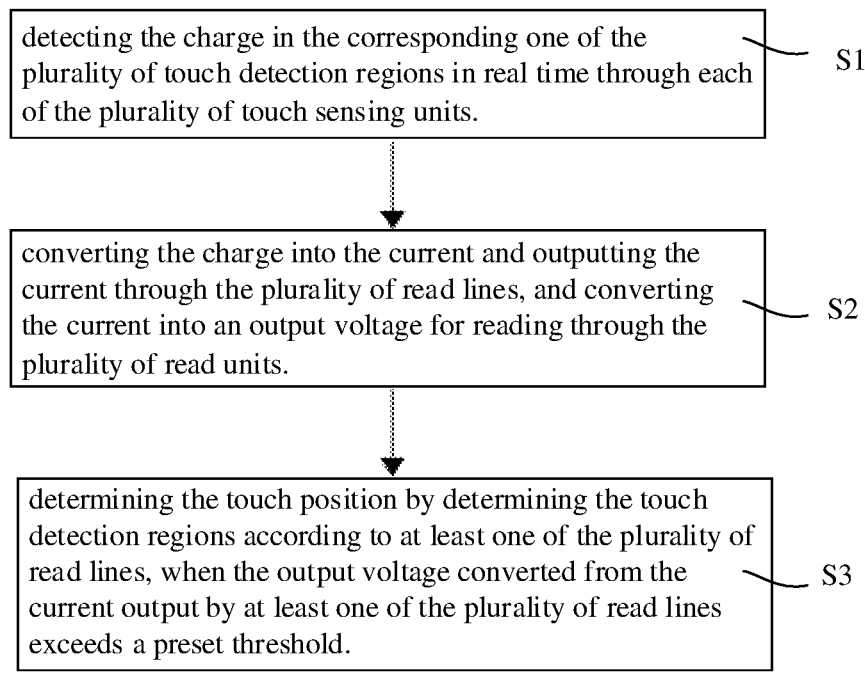
FIG. 5 is a flowchart of a reading method of the capacitive touch screen device provided by an embodiment of the present disclosure.

FIG. 5 is a flowchart of a reading method of a capacitive touch screen device provided by an embodiment of the present disclosure. As shown in FIG. 5, a reading method for the above-mentioned capacitive touch screen device includes following steps:

S1, detecting the charge in the corresponding touch detection region 10 in real time through each of the plurality of touch sensing units 102.

S2, converting the charge in the touch detection region 10 into the current, outputting the current through the plurality of read lines Read, converting the current into an output voltage through the plurality of read units 103, and reading it.

S3, determining the touch position by determining the touch detection regions according to at least one of the plurality of read lines Read when the output voltage converted from the current output by at least one of the plurality of read lines Read exceeds a preset threshold.

In the reading method of the capacitive touch screen device provided by the embodiments of the present disclosure, a touch sensing area is provided for each touch detection region 10, and the charge of the touch detection region 10 is detected in real time through each touch sensing area corresponding to the touch detection region 10. The charge is converted into the current and be output by the read line Read, and finally the output voltage is obtained by integrating the current by the read unit 103, the output voltage is amplified and digital-to-analog converted, and a digitally displayed output voltage is read. In this way, when the digitally displayed output voltage read by the read unit 103 from a certain read line Read exceeds a preset threshold, the vertical coordinate of the touch position is determined according to the read line Read. At the same time, based on the gate line Gate connected to the pixel unit opened being at a high level, a horizontal coordinate of the touch sensing unit 102 corresponding to the touch detection region touched 10 is determined according to the gate line Gate, thereby determining the horizontal coordinate of the touch position, and further determining the touch position according to the horizontal and vertical coordinates of the touch position, wherein the preset threshold refers to a minimum voltage value that can determine an existence of a touch action according to the output voltage.

For example, if a certain touch sensing unit 102 connected to the common electrode line and the gate line Gate of the $80^{th}$-row pixels finally obtains an output voltage Vout through the read line Read and the read unit 103 that is greater than the preset threshold, it is determined that the touch sensing unit 102 is located in the $200^{th}$ column based on the read line Read being located in the $200^{th}$ column. At this time, since the pixels in the $80^{th}$ row is in an turned-on state, i.e., the gate line Gate in the $80^{th}$ row is at a high level, it can be determined that the horizontal coordinate of the touch position is 80 and the vertical coordinate of the touch position is 200.

The foregoing embodiments are merely some embodiments of the present disclosure, and descriptions thereof are relatively specific and detailed. However, it should not be understood as a limitation to the patent scope of the present disclosure. It should be noted that, a person of ordinary skill in the art may further make some changes and improvements without departing from the concept of the present disclosure, and the changes and improvements belong to the protection scope of the present disclosure. Therefore, the protection scope of the present disclosure shall be subject to the protection scope of the appended claims.

What is claimed is:

1. A capacitive touch screen device, comprising:
   a plurality of gate lines, a plurality of data lines, and a plurality of common electrode lines, wherein the plurality of gate lines and the plurality of data lines perpendicularly intersect to form a plurality of pixel units arranged in an array; each of the plurality of common electrode lines is arranged in parallel with each of the plurality of gate lines and is arranged between one row of the plurality of pixel units and one of the plurality of common electrode lines, wherein the plurality of pixel units are divided into a plurality of touch detection regions, and an area of each of the plurality of touch detection regions is smaller than an area of a capacitive touch screen of the capacitive touch screen device touched by a finger;
   a plurality of touch sensing units, wherein each of the plurality of touch sensing units is connected to one of the plurality of gate lines and one of the plurality of common electrode lines connected to any row of the plurality of pixel units in a corresponding touch detection region, and each of the touch sensing units is configured to detect charges in the corresponding touch detection regions; and
   a plurality of read lines, wherein the plurality of read lines are arranged in parallel with the plurality of data lines, and each of the plurality of read lines is configured to connect to the plurality of touch sensing units located in a same column to convert the charges in each of the plurality of touch detection regions into a current and to output the current.

2. The capacitive touch screen device in claim 1, further comprising:
   a plurality of read units connected to the plurality of read lines; wherein the plurality of read units are configured to convert a current output by the plurality of read lines into an output voltage and read it, and a touch position in the plurality of touch detection regions is determined according to changes in the output voltage.

3. The capacitive touch screen device in claim 2, each of the plurality of read units comprising an integrator, an amplifier, and an analog-to-digital converter connected in sequence, wherein the integrator is configured to integrate the current output by the plurality of read lines to obtain the output voltage;

the amplifier is configured to amplify the output voltage; and the analog-to-digital converter is configured to convert the output voltage amplified by the amplifier from an analog signal to a digital signal and read it.

4. The capacitive touch screen device in claim 1, each of the plurality of pixel units comprising a display transistor, a liquid crystal capacitor, and a storage capacitor, wherein a gate electrode of the display transistor is connected to a corresponding gate line, a source electrode of the display transistor is connected to a corresponding data line, and a drain electrode of the display transistor is connected to one end of the liquid crystal capacitor and one end of the storage capacitor; and another end of the liquid crystal capacitor is connected to a common electrode of a color filter substrate, another end of the storage capacitor is connected to a common electrode of an array substrate, and the common electrode of the array substrate is connected to the plurality of common electrode lines.

5. The capacitive touch screen device in claim 4, each of the plurality of touch sensing units comprising a first transistor, a second transistor, a reference capacitor, and a sensing capacitor, wherein a gate electrode and a source electrode of the first transistor are connected to each other and connected to the common electrode of the array substrate connected to any row of the plurality of pixel units, and a drain electrode of the first transistor is connected to a sensing node;

one end of the reference capacitor is connected to the sensing node, and another end of the reference capacitor is grounded;

one end of the sensing capacitor is connected to the sensing node, and another end of the sensing capacitor is grounded; and a gate electrode of the second transistor is connected to the plurality of gate lines connected to any row of the plurality of pixel units, a source electrode of the second transistor is connected to the sensing node, and a drain electrode of the second transistor is connected to a corresponding read line.

6. The capacitive touch screen device in claim 1, wherein each of the touch sensing units is located in a corresponding touch detection region, or between two adjacent touch detection regions.

7. The capacitive touch screen device in claim 1, wherein each of the plurality of touch detection regions comprises a same number of rows of the plurality of pixel units and a same number of columns of the plurality of pixel units.

8. A reading method of the capacitive touch screen device in claim 2, comprising:

S1, detecting the charge in the corresponding touch detection region in real time through each of the plurality of touch sensing units;

S2, converting the charge into the current, outputting the current through the plurality of read lines, and converting the current into the output voltage through the plurality of read units, and reading it; and S3, determining the touch position by determining the touch detection region according to at least one of the plurality of read lines, when the output voltage converted from the current output by at least one of the plurality of read lines exceeds a preset threshold.

9. The reading method of the capacitive touch screen device in claim 8, wherein when the capacitive touch screen is not touched, the charge in the corresponding touch detection region detected by the plurality of touch sensing units is:

$$Q1 = Ci * Vcom$$

wherein Q1 is the charge when the plurality of touch detection regions are not touched, Ci is a capacitance value of a reference capacitor, and Vcom is a potential of a common electrode of an array substrate or a potential of one of the plurality of common electrode lines; and the output voltage read through the plurality of read units is:

$$Vout1 = Ci * Vcom / Cf$$

wherein, Vout1 is the output voltage of the plurality of read units when the plurality of touch detection regions are not touched, and Cf is a feedback capacitance of an integrator.

10. The reading method of the capacitive touch screen device in claim 8, wherein when the capacitive touch screen is touched, the charge in a corresponding touch detection region detected through the plurality of touch sensing units is:

$$Q2 = (Ci + Cp) * Vcom$$

wherein, Q2 is the charge when the plurality of touch detection regions are touched, Ci is a capacitance value of a reference capacitor, Cp is a capacitance value of a sensing capacitor, Vcom is a potential of a common electrode of an array substrate, that is, a potential of one of the plurality of common electrode lines; and the output voltage read through the plurality of read units is:

$$Vout2 = (Ci + Cp) * Vcom / Cf$$

wherein Vout2 is the output voltage of the plurality of read units when the plurality of touch detection regions are touched, and Cf is a feedback capacitance of an integrator.

11. A display device, comprising:

a capacitive touch screen device, comprising:

a plurality of gate lines, a plurality of data lines, and a plurality of common electrode lines, wherein the plurality of gate lines and the plurality of data lines perpendicularly intersect to form a plurality of pixel units arranged in an array; one of the plurality of common electrode lines is arranged in parallel with one of the plurality of gate lines and is arranged between the plurality of pixel units and one of the plurality of common electrode lines, wherein the plurality of pixel units is divided into a plurality of touch detection regions, and an area of each of the plurality of touch detection regions is smaller than an area of a capacitive touch screen of the capacitive touch screen device touched by a finger;

a plurality of touch sensing units, wherein each of the plurality of touch sensing units is connected to one of the plurality of gate lines and one of the plurality of common electrode lines connected to any row of the plurality of pixel units in a corresponding touch detection region; and each of the plurality of touch sensing units is configured to detect a charge in the corresponding touch detection region;

a plurality of read lines arranged in parallel with the plurality of data lines, and each of the plurality of read lines is configured to connect the plurality of touch sensing units located in a same column to convert the charge in each of the plurality of touch detection regions into a current and to output the current; and a plurality of read units connected to the plurality of read lines; wherein the plurality of read units are configured to convert the current output by the plurality of read lines into an output voltage and read it, and a touch position in the plurality of touch detection regions is determined according to changes in the output voltage.

12. The display device in claim 11, each of the plurality of pixel units comprising a display transistor, a liquid crystal capacitor, and a storage capacitor, wherein a gate electrode of the display transistor is connected to a corresponding gate line, a source electrode of the display transistor is connected to a corresponding data line, and a drain electrode of the display transistor is connected to one end of the liquid crystal capacitor and one end of the storage capacitor; and another end of the liquid crystal capacitor is connected to a common electrode of a color filter substrate, another end of the storage capacitor is connected to a common electrode of an array substrate, and the common electrode of the array substrate is connected to the plurality of common electrode lines.

13. The display device in claim 12, the touch sensing unit comprising a first transistor, a second transistor, a reference capacitor, and a sensing capacitor, wherein a gate electrode and a source electrode of the first transistor are connected to each other and connected to the common electrode of the array substrate connected to any row of the plurality of pixel units, and a drain electrode of the first transistor is connected to a sensing node;

one end of the reference capacitor is connected to the sensing node, and another end of the reference capacitor is grounded;

one end of the sensing capacitor is connected to the sensing node, and another end of the sensing capacitor is grounded; and a gate electrode of the second transistor is connected to the plurality of gate lines connected to any row of the plurality of pixel units, a source electrode of the second transistor is connected to the sensing node, and a drain electrode of the second transistor is connected to a corresponding read line.

14. The display device in claim 11, each of the plurality of read units comprising an integrator, an amplifier, and an analog-to-digital converter connected in sequence, wherein the integrator is configured to integrate the current output by the plurality of read lines to obtain the output voltage;

the amplifier is configured to amplify the output voltage; and the analog-to-digital converter is configured to convert the output voltage amplified by the amplifier from an analog signal to a digital signal and read it.

15. The display device in claim 11, wherein each of the plurality of touch sensing units is located in a corresponding touch detection region, or between two adjacent touch detection regions.

16. The display device in claim 11, wherein an area of each of the plurality of touch detection regions is same.

17. The display device in claim 11, wherein each of the plurality of touch detection regions comprises a same number of rows of the plurality of pixel units and a same number of columns of plurality of pixel units.

18. The display device in claim 11, wherein when the capacitive touch screen is not touched, the charge in the corresponding touch detection region detected through the plurality of touch sensing units is:

$$Q1 = Ci * Vcom$$

wherein Q1 is the charge when the plurality of touch detection regions are not touched, Ci is a capacitance value of a reference capacitor, and Vcom is a potential of a common electrode of an array substrate or a potential of one of the plurality of common electrode lines; and the output voltage read through the plurality of reading unit is:

$$Vout1 = Ci * Vcom/Cf$$

wherein, Vout1 is the output voltage of the plurality of read units when the plurality of touch detection regions are not touched, and Cf is a feedback capacitance of an integrator.

19. The display device in claim 11, wherein when the capacitive touch screen is touched, the charge in a corresponding touch detection region detected through the plurality of touch sensing units is:

$$Q2 = (Ci+Cp) * Vcom$$

wherein Q2 is the charge when the plurality of touch detection regions are touched, Ci is a capacitance value of a reference capacitor, Cp is a capacitance value of a sensing capacitor, Vcom is a potential of a common electrode of an array substrate or a potential of the plurality of common electrode lines; and the output voltage read through the plurality of reading unit is:

$$Vout2 = (Ci+Cp) * Vcom/Cf$$

wherein Vout2 is the output voltage of the plurality of read units when the plurality of touch detection regions are touched, and Cf is a feedback capacitance of an integrator.

* * * * *